June 10, 1924.

W. P. EMMETT

DRINKING FOUNTAIN

Filed April 5, 1920

1,497,076

2 Sheets-Sheet 1

Witnesses:

Inventor,
William Page Emmett
By Joshua R. H. Potts
His Attorney.

June 10, 1924.

W. P. EMMETT

DRINKING FOUNTAIN

Filed April 5, 1920

2 Sheets-Sheet 2

1,497,076

Witnesses,

Inventor,
William Page Emmett,
By
His Attorney.

Patented June 10, 1924.

1,497,076

UNITED STATES PATENT OFFICE.

WILLIAM PAGE EMMETT, OF CHICAGO, ILLINOIS.

DRINKING FOUNTAIN.

Application filed April 5, 1920. Serial No. 371,523.

*To all whom it may concern:*

Be it known that I, WILLIAM PAGE EMMETT, a citizen of the United States, and a resident of the city of Chicago, county of Cook, and State of Illinois, have invented certain new and useful Improvements in Drinking Fountains, of which the following is a specification.

My invention relates to new and useful improvements in drinking fountains, and has for its object the provision in a drinking fountain of a nozzle which prevents the waste water from contaminating the source of the drinking water. Another object is the provision in a drinking fountain of a nozzle which will be simple of structure, economic of manufacture and sanitary in use.

Other objects will appear hereinafter.

The invention consists in the combinations and arrangements of parts hereinafter described and claimed.

Figure 1:
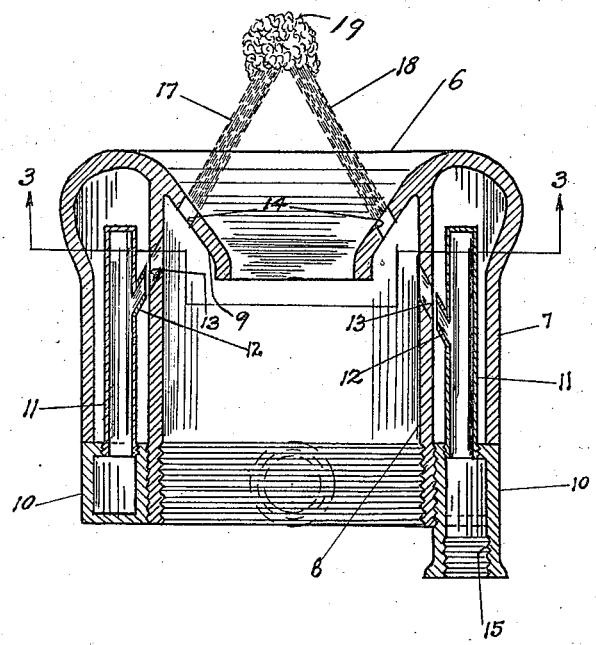
Figure 2:
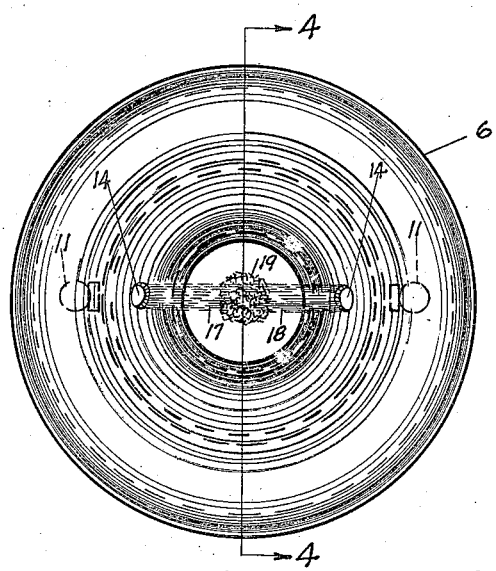
Figure 3:
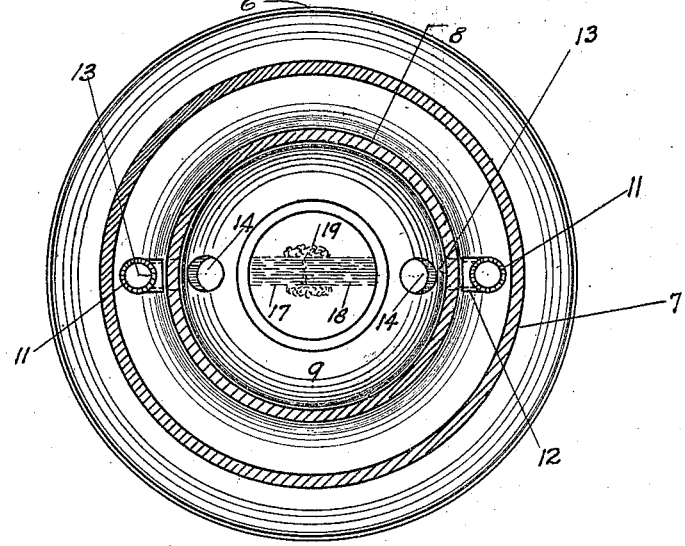
Figure 4:
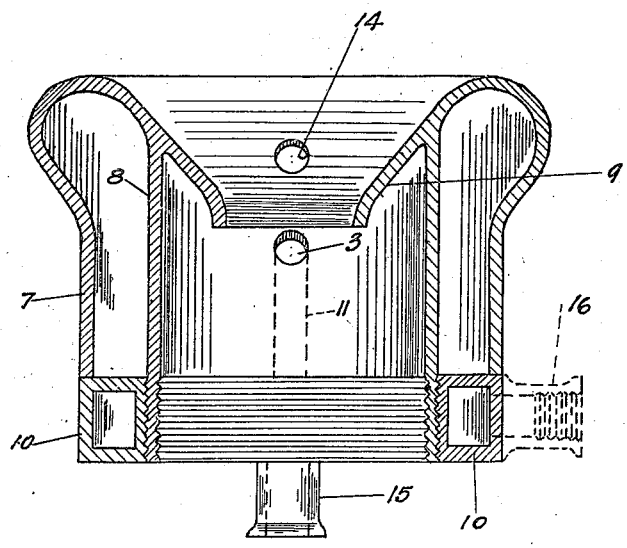

The invention will be best understood by reference to the accompanying drawings forming a part of this specification, and in which, Fig. 1, is a central vertical sectional view of the invention, Fig. 2, a top plan view of the invention, Fig. 3, a sectional view taken on substantially line 3—3 of Fig. 1, and Fig. 4, a sectional view taken on substantially line 4—4 of Fig. 2.

The preferred form of construction comprises a nozzle 6 which is formed cylindrical in shape and provided with walls 7 and 8 which are spaced apart and preferably formed integral at their upper ends. The wall 7 is turned inwardly at its upper end, to form a deflecting rim or basin 9 which is open at the bottom to permit the escape of waste water. The wall 8 is interiorly threaded at its lower end for securing the same to a drain pipe, so that the waste water flowing through the open base or bottom of member 9 may be permitted to escape. As shown, the member 9 is made integral with the wall 7, and this is the preferable form of structure. Secured to the lower end of the member 8 is a cylindrical conduit 10, which affords a passage for water around the member 8. Projecting upwardly from the member 10, at intervals, are pipes 11 which are closed at one end, and provided adjacent the closed end with a diagonally extending outlet portion 12.

The water, when forced through the conduit 10, is forced upwardly through the members 11 and outwardly through the arms 12. Provided in the inner wall 8 is a diagonally extending opening 13, which registers with a diagonally extending opening 14 formed in the rim or basin 9. The position, and the direction of inclination of the portion 12, is such that when water is forced through the conduit 10, the same is directed outwardly through the openings 13 and 14 in streams such as 17 and 18. The angle of inclination of the streams 17 and 18 is such that they are designed to meet in the longitudinal axis of the member 8 to form a geyser-like mass of water 19. This portion 19 is where the drinking is accomplished, the waste water being allowed to drop directly downwardly into the drain pipe fastened to the member 8.

I have shown an inlet member 15, which is interiorly threaded at its end and communicates with the passage 10. The member 15 may be secured to a suitable source of water supply. If preferred, however, a suitable top 16, such as shown in dotted lines in Fig. 4, may be provided, which is secured to the side wall of the conduit 10.

In the drawings I have illustrated but two openings for the escape of the water, but the number may be varied, depending upon the size of the geyser-like mass 19 desired in the fountain.

By constructing the nozzle in the manner indicated, it is evident that the waste water is prevented from reaching the original source of the water, or come in contact with the member 12 in any manner. In drinking fountains such as now constructed, the nozzle generally permits the waste water to come into contact with the discharging means, with the result that saliva is carried to the discharging means and clings around the sides thereof. In time, this saliva gives rise to the presence of a large amount of fungi around the discharging means, which, when the water is turned on in the conduit, is often carried into the mouth of the person drinking. It is evident that by eliminating the presence of this fungi around the source of water supply, the nozzle itself becomes more sanitary in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A drinking fountain including a cylindrical wall, an open bottom basin at the upper end of the wall and provided with sides inclined relatively to the wall, said wall and said sides being provided with opposite pairs of registering openings, a conduit carried by the wall and having projecting conduits provided with discharge openings for directing liquid through the pairs of registering openings.

2. A drinking fountain including a cylindrical wall, an open bottom basin at the upper end of the wall and provided with sides inclined relatively to the wall, said wall and said sides being provided with opposite pairs of registering openings, means for directing a stream of liquid through each pair of registering openings to meet at a point located on the longitudinal axis of the cylindrical wall.

3. A drinking fountain including a nozzle having a cylindrical pair of spaced walls, an open bottom basin at the upper end of the walls and provided with sides inclined relatively to the walls, one of said walls and said sides being provided with opposite pairs of registering openings, and means for directing a stream of liquid through each pair of the openings to meet at a point on a longitudinal axis of the spaced walls.

4. A drinking fountain comprising a cylindrical nozzle having a pair of spaced walls, there being an opening provided in one of said walls; a conduit secured to said walls adjacent the lower end thereof; a deflecting member mounted on said walls adjacent their upper ends, there being an opening provided in said member registering with said opening in said wall; and means extending upwardly from said conduit intermediate said walls and adapted to direct liquid from said conduit through said registering openings, substantially as described.

5. A drinking fountain comprising a cylindrical nozzle; a conduit secured to one end of said nozzle; a deflecting member secured to the opposite end of said nozzle, said deflecting member and the wall of said nozzle being provided with registering openings; and a pipe extending upwardly from said conduit and adapted to direct liquid from said conduit through said registering openings, substantially as described.

6. A drinking fountain comprising a cylindrical nozzle having a pair of spaced walls, there being openings provided in the inner wall of said nozzle; a conduit secured to said walls adjacent their lower ends; a deflecting member secured to said walls adjacent their upper ends, said deflecting member being provided with openings registering with said openings provided in the inner wall of said nozzle; pipes communicating with said conduit and extending upwardly therefrom intermediate said walls; and an arm extending outwardly from each of said pipes and adapted to direct liquid from said conduit through said openings, substantially as described.

7. A device of the class described comprising a cylindrical nozzle adapted for securing to a drain pipe; a conduit secured to said nozzle adjacent the lower end thereof; a pipe communicating with said conduit and extending upwardly therefrom, said pipe being closed at its free end; a deflecting member mounted on said nozzle said member and the wall of said nozzle being provided with registering openings, and a lateral projection on said pipe for directing liquid from said conduit through said openings, substantially as described.

In testimony whereof I have signed my name to this specification in the presence of two subscribing witnesses.

WILLIAM PAGE EMMETT.

Witnesses:
  JOSHUA R. H. POTTS,
  ROSE K. TRIB.